United States Patent
Datta et al.

(10) Patent No.: US 8,620,026 B2
(45) Date of Patent: Dec. 31, 2013

(54) VIDEO-BASED DETECTION OF MULTIPLE OBJECT TYPES UNDER VARYING POSES

(75) Inventors: Ankur Datta, White Plains, NY (US); Rogerio S. Feris, White Plains, NY (US); Sharathchandra U. Pankanti, Darien, CT (US); Behjat Siddiquie, College Park, MD (US); Yun Zhai, Bedford Hills, NY (US)

(73) Assignee: International Business Machines Corporation, Armonk, NY (US)

( * ) Notice: Subject to any disclaimer, the term of this patent is extended or adjusted under 35 U.S.C. 154(b) by 384 days.

(21) Appl. No.: 13/085,547

(22) Filed: Apr. 13, 2011

(65) Prior Publication Data

US 2012/0263346 A1 Oct. 18, 2012

(51) Int. Cl.
*G06K 9/00* (2006.01)

(52) U.S. Cl.
USPC .......................................... 382/103; 382/107

(58) Field of Classification Search
USPC .................... 382/103, 104, 105, 106, 107
See application file for complete search history.

(56) References Cited

U.S. PATENT DOCUMENTS

| | | | |
|---|---|---|---|
| 5,103,305 A | 4/1992 | Watanabe et al. | |
| 5,392,034 A | 2/1995 | Kuwagaki | |
| 5,719,396 A | 2/1998 | Jack et al. | |
| 6,999,623 B1 | 2/2006 | Yamaoka et al. | |
| 7,343,027 B2 * | 3/2008 | Kondo et al. | 382/107 |
| 7,391,907 B1 | 6/2008 | Venetianer et al. | |
| 7,813,526 B1 | 10/2010 | Bourdev | |
| 8,363,107 B2 * | 1/2013 | Inaguma et al. | 348/169 |
| 2006/0114531 A1 | 6/2006 | Webb et al. | |
| 2006/0206243 A1 * | 9/2006 | Pawlicki et al. | 701/1 |
| 2007/0009136 A1 | 1/2007 | Pawlenko et al. | |
| 2007/0154070 A1 * | 7/2007 | Kondo et al. | 382/107 |
| 2008/0137956 A1 | 6/2008 | Yang et al. | |
| 2009/0028440 A1 | 1/2009 | Elangovan et al. | |

OTHER PUBLICATIONS

International Search Report and Written Opinion of Canadian Intellectual Property Office re PCT Application No. PCT/CA2012/050239, Report Issued Jul. 11, 2012.

\* cited by examiner

*Primary Examiner* — Brian Le
(74) *Attorney, Agent, or Firm* — Patrick J. Daugherty; Driggs, Hogg, Daugherty & Del Zoppo Co., LPA (57) ABSTRACT

Training data object images are clustered as a function of motion direction attributes and resized from respective original into same aspect ratios. Motionlet detectors are learned for each of the sets from features extracted from the resized object blobs. A deformable sliding window is applied to detect an object blob in input by varying window size, shape or aspect ratio to conform to a shape of the detected input video object blob. A motion direction of an underlying image patch of the detected input video object blob is extracted and motionlet detectors selected and applied that have similar motion directions. An object is thus detected within the detected blob and semantic attributes of an underlying image patch extracted if a motionlet detectors fires, the extracted semantic attributes available for use for searching for the detected object.

20 Claims, 4 Drawing Sheets

VIDEO-BASED DETECTION OF MULTIPLE OBJECT TYPES UNDER VARYING POSES

BACKGROUND

The present invention relates to using computer vision systems, methods or algorithms to search video image data for objects as a function of pose or motion direction attributes.

Objects and their motion activities as represented in video data may be described through semantic attributes and concepts. Illustrative but not exhaustive examples of object semantics include object color, size, length, width, height, speed, direction of travel, date, time, location of object, as well as measurements from non-visual sensors (for example sound, weight, physical texture, displacement, pressure differentials, radioactive emissions, chemical profile and other data sensors). Accordingly, objects may be defined as representations of one or more of their semantic attribute values, wherein video data may be searched for occurrences of an object, including as distinguished from other objects, by using computer vision applications to search for associated semantic attribute modeling or representations. Examples include face verification and people search applications and tripwire alarm systems, and vehicle tracking and traffic monitoring systems.

However, discernment of objects and their motion patterns from video data by automated video analysis systems and methods may be difficult or unreliable in some environments and applications, for example due to images crowded with multiple objects, fast moving objects, high object occurrence and motion frequencies, image clutter, poor or variable lighting and object resolutions, distracting competing visual information, etc. Object recognition may also be restricted by type, for example models to detect objects of one size may not find objects of other, different sizes.

BRIEF SUMMARY

In one embodiment of the present invention, a method for object detection as a function of a motion direction attribute includes clustering training data set object images corresponding to object motion blobs into each of a plurality of motionlet sets as a function of similarity of their associated motion direction attributes. Each motionlet set comprises object image associated with similar motion direction attributes that are distinguished from the motion direction attributes of the object image blobs in the other motionlet sets. The clustered motionlet object image pluralities are resized from respective original aspect ratios into a same aspect ratio, wherein the original respective aspect ratios may be different. Motionlet detectors are learned for each of the motionlet sets from features extracted from the resized training blobs and from sets of negative images of non-object image patches of the same aspect ratio obtained from background images. A deformable sliding window is applied to detect an object blob in an input video obtained by background modeling by varying at least one of sliding window size, shape and aspect ratio to conform to a shape of the detected input video object blob. A motion direction of an underlying image patch of the detected input video object blob is extracted and one or more of the motionlet detectors selected having motion directions similar to the extracted motion direction and applied to the detected input video object blob. An object is thus detected within the detected input video object blob and semantic attributes of the underlying image patch extracted if one of the selected and applied motionlet detectors fires, the extracted semantic attributes stored in a database or otherwise made available for searching for the detected object as a function of its extracted semantic attributes.

In another embodiment, a system has a processing unit, computer readable memory and a computer readable storage medium device with program instructions to cluster training data set object images corresponding to object motion blobs into each of a plurality of motionlet sets as a function of similarity of their associated motion direction attributes. Each motionlet set comprises object image associated with similar motion direction attributes that are distinguished from the motion direction attributes of the object image blobs in the other motionlet sets. The clustered motionlet object image pluralities are resized from respective original aspect ratios into a same aspect ratio, wherein the original respective aspect ratios may be different. Motionlet detectors are learned for each of the motionlet sets from features extracted from the resized training blobs and from sets of negative images of non-object image patches of the same aspect ratio obtained from background images. A deformable sliding window is applied to detect an object blob in an input video obtained by background modeling by varying at least one of sliding window size, shape and aspect ratio to conform to a shape of the detected input video object blob. A motion direction of an underlying image patch of the detected input video object blob is extracted and one or more of the motionlet detectors selected having motion directions similar to the extracted motion direction and applied to the detected input video object blob. An object is thus detected within the detected input video object blob and semantic attributes of the underlying image patch extracted if one of the selected and applied motionlet detectors fires, the extracted semantic attributes stored in a database or otherwise made available for searching for the detected object as a function of its extracted semantic attributes.

In another embodiment, an article of manufacture has a computer readable storage medium device with computer readable program code embodied therewith, the computer readable program code comprising instructions that, when executed by a computer processor, cause the computer processor to cluster training data set object images corresponding to object motion blobs into each of a plurality of motionlet sets as a function of similarity of their associated motion direction attributes. Each motionlet set comprises object image associated with similar motion direction attributes that are distinguished from the motion direction attributes of the object image blobs in the other motionlet sets. The clustered motionlet object image pluralities are resized from respective original aspect ratios into a same aspect ratio, wherein the original respective aspect ratios may be different. Motionlet detectors are learned for each of the motionlet sets from features extracted from the resized training blobs and from sets of negative images of non-object image patches of the same aspect ratio obtained from background images. A deformable sliding window is applied to detect an object blob in an input video obtained by background modeling by varying at least one of sliding window size, shape and aspect ratio to conform to a shape of the detected input video object blob. A motion direction of an underlying image patch of the detected input video object blob is extracted and one or more of the motionlet detectors selected having motion directions similar to the extracted motion direction and applied to the detected input video object blob. An object is thus detected within the detected input video object blob and semantic attributes of the underlying image patch extracted if one of the selected and applied motionlet detectors fires, the extracted semantic attributes stored in a database or otherwise made available for searching for the detected object as a function of its extracted semantic attributes.

In another embodiment, a method for providing a service for object detection as a function of a motion direction attribute includes providing one or more articles, including a motionlet splitter that clusters training data set object images corresponding to object motion blobs into each of a plurality of motionlet sets as a function of similarity of their associated motion direction attributes. An aspect ratio resizer resizes clustered motionlet pluralities of object images from their respective original aspect ratios into a same aspect ratio. A motionlet detector builder builds motionlet detectors for each of the motionlet sets from features extracted from the resized training blobs and from sets of negative images of non-object image patches of the same aspect ratio obtained from background images. A sliding window applicator detects an image blob in an input video and deforms a sliding window to frame about the detected blob in response to a shape of the detected blob by varying a size, shape or aspect ratio of the sliding window to conform to the shape of the detected blob. A feature extractor extracts a motion direction of an underlying image patch of the detected input video object blob, selects one or more motionlet detectors with motion directions similar to the extracted motion direction, applies the selected motionlet detector(s) to the detected input video object blobs, and determines that an object has been detected within the detected input video object blob and extracts semantic attributes of the underlying image patch of the input video object blob if a selected and applied motionlet detectors fires, storing the extracted semantic attributes of the underlying image patch of the input video object blob in a database or otherwise making them available for searching for the detected object as a function of its extracted semantic attributes.

BRIEF DESCRIPTION OF THE SEVERAL VIEWS OF THE DRAWINGS

These and other features of this invention will be more readily understood from the following detailed description of the various aspects of the invention taken in conjunction with the accompanying drawings in which.

The drawings are not necessarily to scale. The drawings are merely schematic representations, not intended to portray specific parameters of the invention. The drawings are intended to depict only typical embodiments of the invention and, therefore, should not be considered as limiting the scope of the invention. In the drawings, like numbering represents like elements.

DETAILED DESCRIPTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in a baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including, but not limited to, wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Semantic attributes may provide high-level object representations, and have been utilized in some computer vision applications, including zero-shot recognition, face verification, and people search systems. Although inherently present in some image retrieval, scene classification, and broadcast video search routines, difficulties in implementation and high processing costs generally prevent computer vision application systems from providing object searching capabilities based on detailed, fine-grained attributes. Although systems may rely on background modeling for detection of moving objects, such systems generally fail to handle crowded scenes as multiple objects close to each other are generally merged into a single motion blob. Environmental factors such as shadow effects, rain, snow, etc. also cause issues for object segmentation.

Although some adaptive appearance-based object detectors are known that have capabilities to adapt or otherwise adjust to crowds and environmental factors, for example Adaptive Boosting ("Adaboost") learning processes, such systems present difficulties in adequately dealing with certain highly non-linear appearance changes in training sets, including those introduced by object pose variations. Some solutions address this problem by splitting training data based on appearance clustering; however, the computational demands render such processes slow and otherwise impractical as multiple detectors need be applied. Such approaches may also lead to overfitting from small partitions. Overfitting occurs when a statistical model describes random error or noise instead of the underlying relationship, and generally occurs when a model is excessively complex, such as having too many parameters relative to the number of observations. A model which has been overfit will generally have poor predictive performance, as it can exaggerate minor fluctuations in data.

Appearance-based detectors have limited ability to handle multiple, different object types; for example in the case of vehicle detection, to handle automobiles as well as larger buses, SUVs, etc., or smaller motorcycles. Such detectors employ a sliding window with a fixed aspect ratio which cannot adjust to the width and height of different vehicle types and shapes. Although separate detectors may be trained for multiple vehicle classes, if the number of classes is large, then a large number of samples for each class is required to avoid overfitting. Part-based object detectors may allow for variable bounding box windows; however, such approaches are generally unsuitable for low resolution images and also must be run in multiple appearance spaces; hence, they are not efficient or practical in real-world video applications that require processing of multiple video channels.

Figure 1:
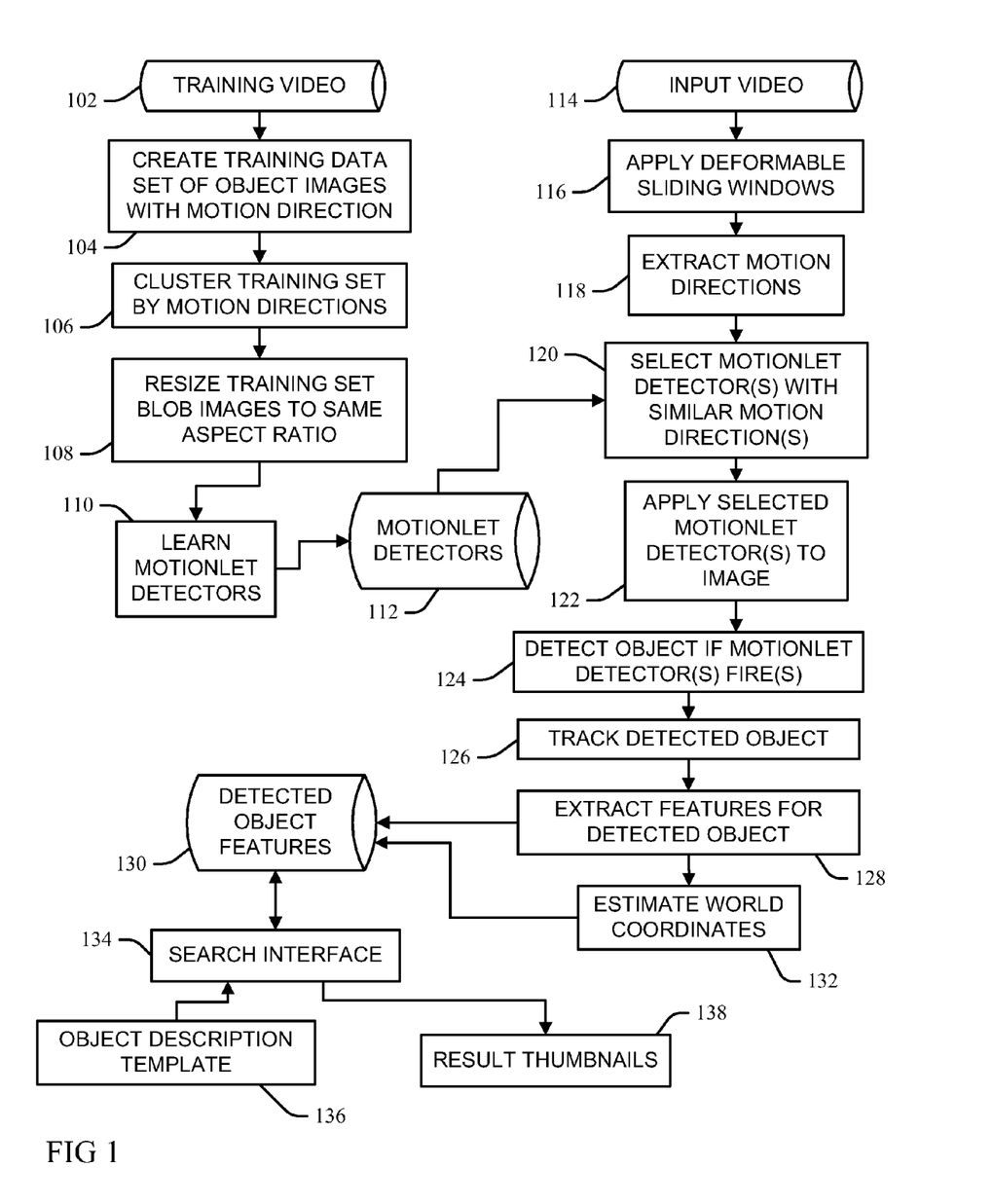
FIG. 1 is a flow chart illustration of an embodiment of a method or system for object detection as a function of a motion direction semantic attribute according to the present invention.

Referring now to FIG. 1, an embodiment of a method, process or system for object detection as a function of semantic attributes including pose or motion direction attributes according to the present invention is illustrated. The present system or process provides for multi-view object detection, and works well in real-world video data environments involving crowding, lighting changes, and different object types, while running at high frame rates. At 104 a training video data set is created comprising object images corresponding to object motion blobs representing objects detected and collected from input training video data 102 via a background modeling process (for example using Gaussian mixture processes, though other systems and methods will be apparent to one skilled in the art). As will be appreciated by one skilled in the art, object motion blobs are generally black/white images where white areas correspond to motion and black areas to non-motion regions, and wherein the underlying image regions are used as the training data set. Creating the training video data set at 104 comprises selecting a set of blob images that each contain objects of different types under multiple lighting conditions and comprising many different poses captured from one or more video cameras, wherein blobs found in a user-defined region of interest (ROI) and having an acceptable size, aspect ratio, and an ascertainable direction of motion are automatically added to the training set at 104. More particularly, each training image in the dataset contains an associated motion direction of the object obtained through an optical flow process at 104. In some embodiments, false positives may be manually removed to further refine the training set at 104.

Figure 2:
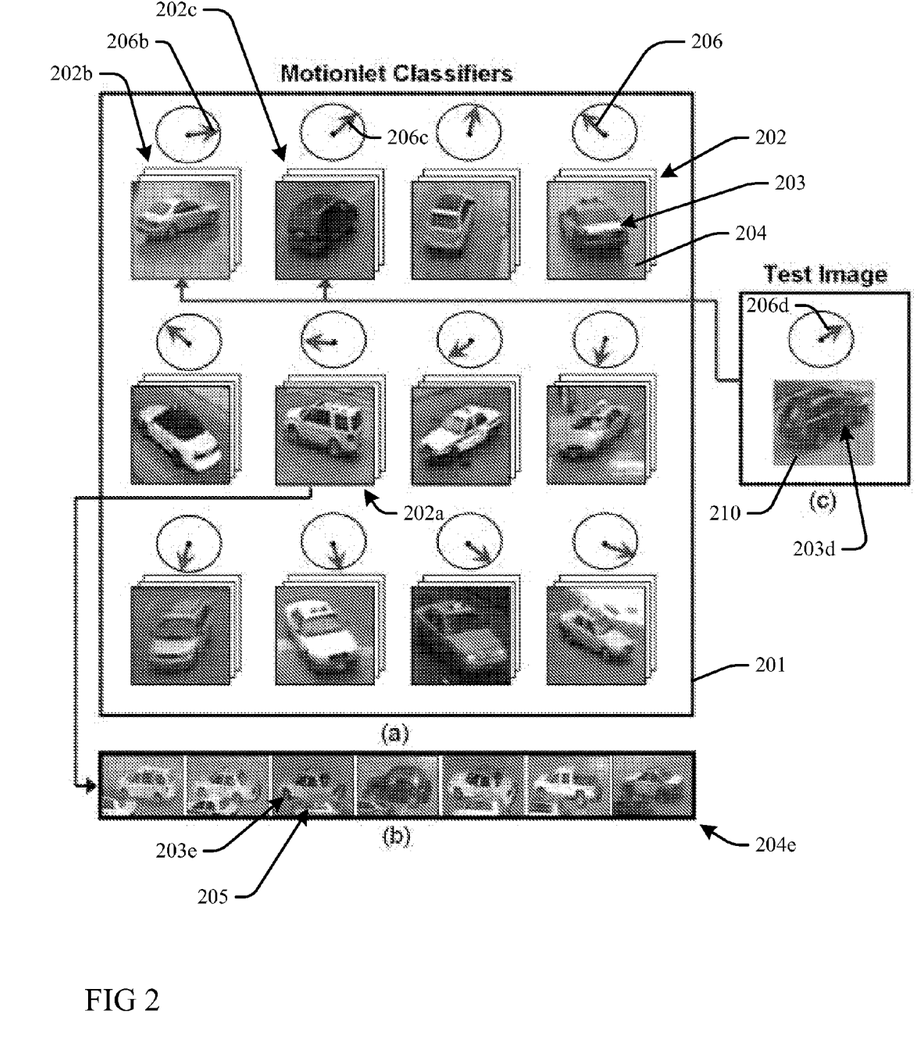
FIG. 2 is a diagrammatic illustration of examples of images, motion direction indicators and motionlet detectors according to embodiments of the present invention.

At 106 the training set of object images is automatically split into a plurality of "motionlets," which are subsets of the object images clustered as a function of similarity of their associated motion directions. More particularly, the dataset partitioning at 106 is based on motion direction and is fully automatic, with no need for a user to manually label object poses. The motionlet images are clustered in a motion configuration space as a function of comprising object images containing similar motion direction attributes distinguished from those in the other, different motionlets. FIG. 2 illustrates one embodiment according to the present invention wherein the objects or interest are vehicles 203, though other embodiments of the present invention may be directed toward other objects tending to motion in video data (for example, boats, bicycles, people and other flora and fauna, etc.). In the present example, a training video data set 104 is split into twelve (12) different motionlet detector sets 202, which comprise sets of images 204 that are clustered according to associated motion direction attributes 206 extracted or otherwise determined for the vehicle images 203 in the motionlets 204. It is to be understood that more or less motionlet detector sets 202 may be practiced in other embodiments.

Since vehicles are rigid objects and move along their longitudinal axis, each motionlet detector set 202 comprises images semantically related to vehicle image 203 pose information. In one embodiment, a two-dimensional (2D) optical flow process is used to determine the motion direction attributes 206, although other processes may be practiced (for example, three-dimensional (3D) processes that determine structure from motion.

Figure 3:
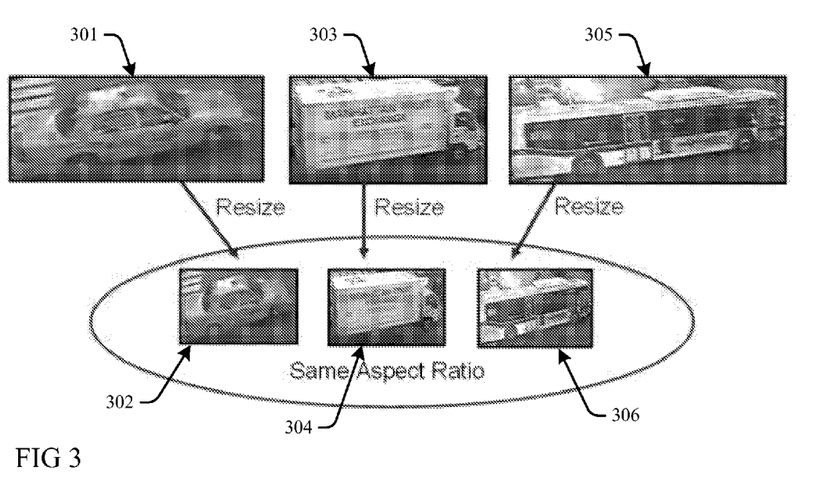
FIG. 3 is a diagrammatic illustration of examples of training images in original and resized aspect ratios according to embodiments of the present invention.

Referring again to FIG. 1, and now also to FIG. 3, at 108 pluralities of the training set images 104 are resized from their respective original aspect ratios into a same aspect ratio, wherein the motionlet object images may have different original respective aspect ratios. In one aspect, resizing training images to a same pixel aspect ratio enables modeling of the appearance of each of a plurality of different object types and sizes, irrespective of their different sizes (for example, with respect to vehicle objects, car size relative to bus or truck size, etc). The set of resized images at 108 may be described as belonging to a shape-free appearance space, since original information about aspect ratio is lost or otherwise removed from consideration in image processing according to embodiments of the present invention. In one embodiment, each of training set images for an automobile 301, a truck 303 and a bus 305 having different aspect rations are resized to respective resized images 302, 304 and 306 that all have the same 24-by-24 pixel aspect ratio. (It will be appreciated that other aspect ratios may also be practiced in embodiments of the present invention.) In other embodiments, training set images are resized as a function of their respective, different object types; for example, images of automobiles 301 are resized into a same automobile image pixel ratio specification, and images of trucks 303 are resized into a truck image pixel ration specification, wherein the automobile and truck image pixel ratio specifications may be the same or different.

At 110 one or more motionlet classifiers or detectors 112 are learned for each of the motionlet detector sets 202 for application to input video 114. In the present embodiment, the learning process at 110 for a particular motionlet detector at 112 is based on a variation of an Adaboost learning process, which is adaptive in the sense that detectors built and used at 112 may be subsequently tweaked in further learning iterations in favor of those instances misclassified by previous classifier/detectors. (However, the invention is not limited to Adaboost learning process applications, and other processes and techniques may be practiced in building or refining the motionlet detectors 112.) Thus, in one example, a training video input data set 102 comprising a set of positive images of 24-by-24 pixel vehicle images 203 with similar motion directions 206, and a set of negative images of 24-by-24 pixel non-vehicle image patches obtained from a plurality of background images (in one embodiment, around one thousand background images) is used to generate a set 112 of twelve motionlet detector sets 202 illustrated in FIG. 2.

In the present embodiment, the motionlet detectors 202 are used to separate vehicles in input video data 114 images from non-vehicles in said input video images and covering each of the twelve motion directions 206. In other embodiments, more or fewer motionlet detector sets 202 may be practiced or learned, for example depending on the amount of training data. In one example of the present embodiment, each clustered set 202 of motionlet images 204 comprising a plurality of different image vehicle types with different sizes (cars, trucks, buses, etc.) each sharing a same determined motion direction 206, are used to learn and build only one motionlet detector for each entire set 202 at 110. Other examples train pluralities of different detectors for different object sizes within each clustered set 202 of motionlet images 204. For example, the vehicle images in a motionlet detector set 202 sharing a same determined motion direction 206 are used to learn and build a plurality of motionlet detectors at 110, one for each of different vehicle types: a first for cars, another one for trucks, another one for buses, etc.

Embodiments of the present invention may introduce different and multiple feature planes in a feature selection process for the learned motionlet detectors. Illustrative but not exhaustive feature plane examples include color planes (gray-scale, red, green, and blue channels, etc.), gradient magnitude, texture descriptors, multispectral planes, local binary patterns (LBP's), etc. Utilizing multiple feature planes increases the power of the motionlet detectors 202, for example combining the Haar-like digital image features used in object recognition of different modalities. In this framework, feature selection may be performed over a pool containing large sets of feature configurations, sets of potentially millions.

In general, Adaboost training times for learned detectors may be significant. In the case of a single feature plane and only a few thousand images, training may take days on a standard desktop computer system. Adaboost learning is also inherently sequential, which may make scaling difficult in general. However, embodiments of the present invention may achieve time efficiencies by parallelizing at the level of the features. More particularly, training the motionlet detectors at 110 may comprise computing a large number of features for all training images and selecting the feature that better classifies the data, and such computing and selecting may be done in parallel, with each of a plurality of central processing units (CPU's) working on a subset of the features, and wherein the amount of synchronization necessary is minimal; each CPU need to report only the best feature of its particular subset.

Further, training each of the motionlet detectors at 110 may comprise selecting sets of negative patches for which a current detector 112 fails from a larger set of available negative images, which may also be time-consuming in later stages of cascade training, for example taking hours even for a small training set. Thus, embodiments of the present invention also implement parallelization in this process, with each of a plurality of CPU's searching for negative patches in different subsets of the negative images, and wherein an amount of time required for synchronization is comparatively very small, allowing for an almost linear speed-up with the number of CPU's employed.

Some embodiments of the present invention consider parallel feature selection over four color planes (gray-scale, red, green, and blue channels). By using additional color planes (in contrast to prior art detectors learned from fewer features) the robustness of a motionlet detector 112 may be improved and a sparser solution achieved with a smaller number of selected features, which in turn reduces computation time during inference. Adding more feature planes (for example, gradients and texture descriptors, multispectral planes, etc.) may afford even greater result improvements.

In order to better deal with occlusions, which are common in crowded scenarios, some embodiments artificially generate additional occluded motionlet vehicle image samples for inclusion into the motionlet image sets 202. For example, in the present embodiment, the occluded images 204e are incorporated into the motionlet set 202a, which are generated by synthetically creating images of other objects (for example, other vehicles 205, pedestrians, street signage, etc.) partially occluding a vehicle image 203e associated with the same direction attribute 206, or vice-versa, in some embodiments by using Poisson image editing.

Figure 4:
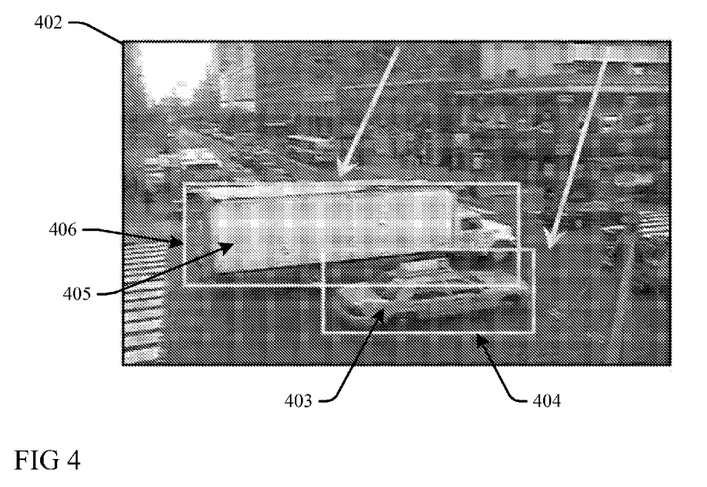
FIG. 4 is a diagrammatic illustration of a video input field of view comprising vehicles detected according to embodiments of the present invention.

Referring again to FIG. 1, embodiments of the present invention apply deformable sliding window hypotheses at 116 to object blobs detected in the input video 114 by conforming the deformable sliding window hypotheses to shapes of each detected object blob. In one aspect, the motionlet detectors 112 are learned in a shape-free appearance space during a training phase, wherein during application to input data at a test time at 116 the deformable sliding window hypotheses may be deformed arbitrarily to match multiple shapes. For example, FIG. 4 illustrates a field of view 402 of an input video data stream 114 wherein sliding window hypotheses of different sizes and aspect ratios are applied to each of different vehicle objects detected in the field of view 402; a first sliding window 402 is deformed and applied to an automobile 403, and a second sliding window 406 is deformed to a larger window size (and which in the present example also has a different aspect ratio) and applied to a truck 405 found within the image field 402. In some embodiments, deforming the sliding window hypotheses 402 and 406 comprises varying an aspect ratio of a sliding window. In other embodiments, the shapes of deformable sliding window hypotheses may be deformed in arbitrary ways to conform to a detected object blob, for example into various curved shapes conforming to blob shapes and that are beyond rectangle shapes defined by two-dimensional aspect ratios.

The present embodiment thus detects multiple vehicle types wherein the field of image 402 is scanned not only at multiple positions and scales, but also by allowing the respective search windows 404 and 406 to deform their shapes, including by changing their aspect ratios or otherwise to fit to the respective detected automobile 403 and truck 405. This enables the detection of multiple vehicle types and/or sizes, ranging from large trucks or buses to compact cars. Cameras used to generate the input video 114 may be fixed, and search schemes of embodiments of the present invention may be applied only on motion blobs obtained by background modeling, in one aspect to improve efficiency and accuracy.

For each deformable search window hypothesis 404 or 406, a motion direction of an underlying image patch of the detected input video object blob is extracted through optical flow at 118, which is used at 120 to select one or more of the motionlet detectors 112 for a motionlet set 202 having a similar motion direction 206 for application to the input video object blob at 122, wherein if any of the applied motionlet classifiers fires at 124, then a vehicle image has in fact been detected and determined within the image blob found by the sliding window at a 118. For example, FIG. 2 illustrates a test blob image 210 that has been found within the input video data 114 through a sliding window hypothesis at 116, and wherein a motion direction 206d of an underlying vehicle image patch 203d is extracted through optical flow at 118. Motionlet detectors 112 for first and second clustered sets 202b and 202c are selected at 120 as having motion directions 206b and 206c similar to the motion direction 206d determined for the test image, and accordingly their associated motionlet detectors 112 are applied to the candidate image patch 210 at 122.

The detectors 122 fire if the underlying vehicle image patch 203d extracted from the blob 210 in the field of view 404 corresponds to image patches of the applied motionlet detector(s) 112 for either of the first and second clustered sets 202b and 202c. For example, the results of the applied motionlet detectors 202b and 202c may be combined by an "OR" Boolean operator, with any positive output indicating a firing by either one. Motionlet detectors 112 generally detect points or regions in an image that are either brighter or darker than surrounding areas to obtain regions of interest, for example through differential methods based on derivative expressions or methods based on local extrema in an intensity landscape. Examples of motionlet detectors 112 include Laplacian of the Gaussian (LoG) detectors, scale-normalized determinants of Hessian matrices (also referred to as Monge-Ampère operators), and hybrids thereof, and still other appropriate detectors 122 will be apparent to one skilled in the art of computer vision applications.

The motionlet detectors 112 for the motionlet sets 202 may be deformable. In one embodiment, application at 122 comprises deforming single motionlet detector 202 to conform to the both of the different sliding object windows 402 and 406 by varying the aspect ratio (though other deformations may be practiced, for example changing the detector shape, size, etc.), wherein the deformable motionlet detector 112 handles multiple object types and sizes. In other embodiments of the present invention, each of different object-type motionlet detectors 112 may be applied to their corresponding object types; for example, an automobile-type motionlet detector 112 deformed and applied to the blob 210 in response to identifying the underlying vehicle image patch 203d as an automobile, a different bus-type motionlet detector 112 deformed and applied to the blob 210 in response to identifying the underlying vehicle image patch 203d instead as a bus, etc.

Embodiments of the present invention provide improved accuracy over prior art methods and avoid non-linearities in training sets through clustering based instead on appearance and tree-based architectures. Assuming fixed surveillance cameras, embodiments may capture the structure of a scene within the field of view 402 by analyzing the motionlet classifier or classifiers most selected at 120 over a period of time and applying only that/those motionlet(s) to future sliding images. For example, some scenes 402 may contain vehicles in a single or limited set of poses, such as vehicle images in a view 402 of a limited access freeway lane, wherein each vehicle is expected to face in a similar direction as constrained by their motion behavior at freeway speeds, wherein only a single motionlet 202 need be applied. Thus, embodiments of the present invention may allow for additional efficiencies by omitting the optical flow computation at 118 and motionlet selection process at 120 and instead save processing resources and testing time by directly moving from sliding window application at 116 to applying the recognized the selected motionlet detector at 122. Additionally, selected classifiers 202 may also be interleaved across video input 114 frames to obtain higher frame rates. In some embodiments, the process may run at more than sixty (60) frames per second, which is appropriate for real-time surveillance deployments which may require many video channels to be processed per server.

Embodiments of the present invention may track a detected vehicle at 126, linking a plurality of the detections of a same vehicle over a plurality of frames in a video sequence of the video input 114 in order to avoid indexing attributes of the same vehicle multiple times and avoid drifting. In some embodiments, this is accomplished by a correlation-based tracker triggered at 126 that is combined with vehicle detection at every frame, so that when a vehicle detected at 124 is not detected by any motionlet classifier in a subsequent frame, tracking may be performed within the window given by the correlation tracker. Further, if a vehicle detector reports a prior window result at 124 with a position and size close to a current tracking window result, then the current vehicle detection window result may be used to update tracking of the prior window result.

At 128 fine-grained semantic feature attributes are extracted for each vehicle detected at 124 and tracked at 126, and stored or otherwise provided for use at 130 in vehicle searching. The extracted fine-grained feature attributes may be automatically ingested as attribute metadata into a backend database system 130 through a web-based service-oriented architecture, though other processes and data storage may be practiced. Illustrative but not exhaustive examples of embodiments of the present invention extract one or more of the following metadata and attributes from the detected/tracked vehicles at 128:

Date, Time and Location. For example, a timestamp may indicate the beginning, end, and/or duration of detection and tracking of a vehicle at 126. Information about a camera used to capture the image and the camera location on a map may also be stored with the extracted data at 128/130, wherein a user may search for events in a particular geographic region covered by said camera at a particular date/time.

Direction of Travel. This information is implicitly present in the associated motionlet classifiers 202. In some embodiments, a motion direction histogram is built for each tracked vehicle, and one or more motion directions 206 with larger or largest number of votes may be noted or stored in a database 130.

Dominant Color. A dominant color may be extracted for each detected/tracked vehicle. In some embodiments, a set of dominant colors is provided for selection by a user to search for vehicles, for example six (6) colors: black, white, red, green, blue, and yellow. The dominant color may be computed by initially converting each input video frame into a bi-conic HSL (hue, saturation, and luminance) space, and then quantizing the HSL space into the set of dominant colors. This quantization may be done by computing the hue angular cutoffs between the colors in a first stage and, in a second stage, relabeling pixels as either white or black depending on whether they lie outside the lightness/saturation curve above or below the horizontal mid-plane. A cumulative histogram with bins for each of the set colors in this quantized space may be built over the vehicle images belonging to a specific detected vehicle track, wherein the color corresponding to the bin which receives the majority of votes is then assigned as the dominant color.

Vehicle Dimensions. Embodiments of the present invention may also provide a precise bounding box and consequently the width and height in pixels for various types of vehicles. Pixel measurements, however, are sensitive to perspective, for example a small car can look big if it is close to the camera, and the converse; embodiments of the present invention may solve this issue by calibrating the scene in the image field of view 402 and estimating the width, height, and length of vehicles in world coordinates, as described more particularly supra. For example, embodiments may take the median value for each dimension over an entire detected vehicle track and ingest those values in the database 130.

Speed. Once the position of a particular detected vehicle is determined in world coordinates at each video frame (as more fully discussed supra), it is straightforward to compute its speed. Thus, in some embodiments, the average speed of a tracked vehicle may be stored in the database 130.

As will be apparent to one skilled in the art, still other object image attributes applicable to the target object may be identified and features relevant thereto extracted for use at 130. For example, in the case of vehicle objects, certain wheel covers, distinguishing body shapes, sunroofs, tail hitches, etc., could be considered.

Feature extraction at 128 may comprise measurements or estimations of expected object features used to generate world coordinate representations of the detected objects at 132, the world coordinates stored in the database or otherwise provided for use in searching at 130. For example, in applications such as traffic counting and large vehicle monitoring, distinguishing vehicles may be required (e.g., distinguishing trucks and buses from automobiles, and/or from each other). Thus, the 3D characteristics of detected vehicles such as width, height and length may be determined (for example, through measuring processes utilizing camera calibration information) or estimated (for example, from 3D vehicle modeling's incorporated to represent the actual position and orientation of the vehicle in real-world).

In one example, camera calibration is achieved by a manual specification process. For example, a user may define a 3D cube sitting on a ground plane and having edges with equal length as specified by the user through a definition interface and a calibration matrix (for example, a 3×4 matrix) estimated using a least square fit method by matching the 3D cube corners with their 2D correspondences in the image plane. A calibration may also be refined by visually viewing how well the vehicle model is projected to the image plane and fitted to an observed vehicle). Once the camera calibration matrix is obtained, it may be used to match a 3D vehicle model with a target object to provide estimations for generating the desired world coordinates at 132.

Generating world coordinates at 132 through estimations may also entail correctly projecting a 3D vehicle model onto a detected 2D image such that its projection fits a detected vehicle. In one example, this may be accomplished through knowing three things for the model: its location on the ground plane, orientation of heading direction and the scale of the model. Thus, in one estimation process, a location may be initialized as the intersection of the ground plane with the line that goes through a 2D vehicle centroid and a camera center (using backward projection) which may be further refined once the other information is known. Assuming there are prior samples of the same detected vehicle from previous frames through the tracking process at 126, its heading direction may be estimated as a motion vector between its current 3D location and its previous location on the ground plane, the vehicle model then rotated such that it aligns with the motion vector. If a vehicle is static, its previous heading direction may be used. Scales of vehicles may also be estimated, for example by using a bounding box of an observed vehicle in a detected image and a bounding box of a 2D projected model, wherein an aspect ratio difference between the bounding boxes in the 2D dimensions is computed; utilizing backward projection, scales in the length and width dimensions of the vehicle model can be estimated. Thus, 3D features such as real length, width, height and speed can thus be effectively estimated from object location, orientation and scale to provide world coordinates at 132.

Embodiments of the present invention enable searching for detected vehicles through their semantic attributes, for example their extracted and/or estimated features provided at 130. In one embodiment, a Search Interface 134 in communication with the database/data provided at 130 provides a Vehicle Description Template 136 to user for input of query terms. In one example, the Vehicle Description Template 136 is a form with fields for entering specific features through a web-based interface (for example, direction of travel, color, size, speed, body shape, wheel covers, decals, damages, presence of features such as sunroof, etc.), wherein the Search Interface 134 uses the features input at 136 to perform a Structured Query Language (SQL) event search query (for example, "Show me all blue trucks larger than 7 ft length traveling at high speed northbound last Saturday, from 2 pm to 5 pm") request to a web server, and wherein Java servlets receive the information and issue queries to the backend database 130. Results are presented to the requesting user at 138, in the present example as thumbnails of the detected vehicles displayed as search results, wherein a user may click on a thumbnail to view a video clip of the selected vehicle.

Thus, embodiments of the present invention automate searching for objects based on semantic attributes. The present example allows a user to search for vehicles based on color, size, length, width, height, speed, direction of travel, date/time and location, and other attributes, including measurements from non-visual sensors. Prior art approaches generally rely on license plate recognition or vehicle classification, which may not be effective for low-resolution cameras or when the plate number is not available, while embodiments of the present invention instead provide a complementary search framework based on fine-grained attributes. For instance, a user may find trucks with a length or height larger than the permitted sizes in specific highways, or correlate visual vehicle attributes with carbon emission measurements obtained from other sensors. Search based on semantic attributes may also help identify and distinguish specific vehicles of similar size and shape, e.g., shipping trucks or taxis of certain companies may be identified and distinguished from other trucks and taxis based on their company-specific coloring and/or sizing. Wherein traditional surveillance systems based on background modeling generally fail to handle challenging conditions, such as crowded urban scenes and lighting changes, as multiple vehicles tend to get clustered into a single motion blob, the learned motionlet detectors may distinguish and segment target vehicles from other vehicles in crowded images through their extracted features, and as helped through training the detectors 202 with occluded images (for example, the occluded images 204e described above). In addition, multiple types of vehicles, such as buses, trucks, SUVs, and compact cars can be detected by training the motionlet detectors in a shape-free appearance space, where all training images are resized to the same aspect ratio. Measurements such as speed, width, height, and length of vehicles may be converted to world coordinates through calibration processes, thus allowing search across multiple cameras without perspective issues.

Figure 5:
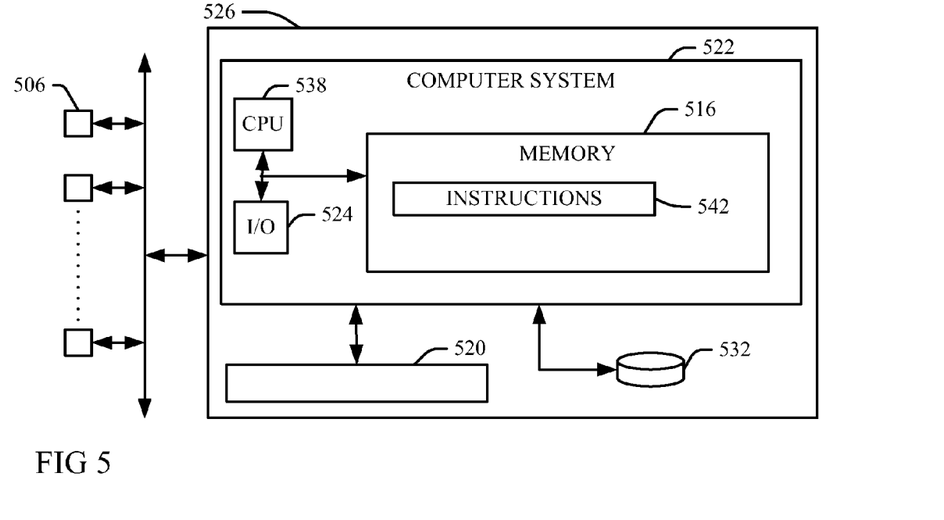
FIG. 5 is a block diagram illustration of a computerized implementation of an embodiment of the present invention.

Referring now to FIG. 5, an exemplary computerized implementation of an embodiment of the present invention includes computer or other programmable device 522 in communication with other devices 506 (for example, video cameras or video servers, or memory devices comprising a database of images, etc.). Instructions 542 reside within computer readable code in a computer readable memory 516, or in a computer readable storage system 532, another device 506 or other computer readable storage medium that is accessed through a computer network infrastructure 526 by a processing unit (CPU) 538. Thus, the instructions, when implemented by the processing unit (CPU) 538, cause the processing unit (CPU) 538 to learn detectors and find detected objects in video data as a function of semantic attributes including motion direction as described above with respect to FIGS. 1 through 4.

The computer 522 comprises various components, some of which are illustrated within the computer 522. The processing unit 538 is in communication with one or more external I/O devices/resources 524, storage systems 532 or other devices 520. The processing unit 538 may comprise a single processing unit, or be distributed across one or more processing units in one or more locations, e.g., on a client and server. Similarly, the memory 516 and/or the storage system 532 can comprise any combination of various types of data storage and/or transmission media that reside at one or more physical locations. Further, I/O interfaces 524 can comprise any system for exchanging information with one or more of an external server and/or client (not shown). Still further, it is understood that one or more additional components (e.g., system software, math co-processing unit, etc.), not shown, can be included in the computer 522.

Figure 6:
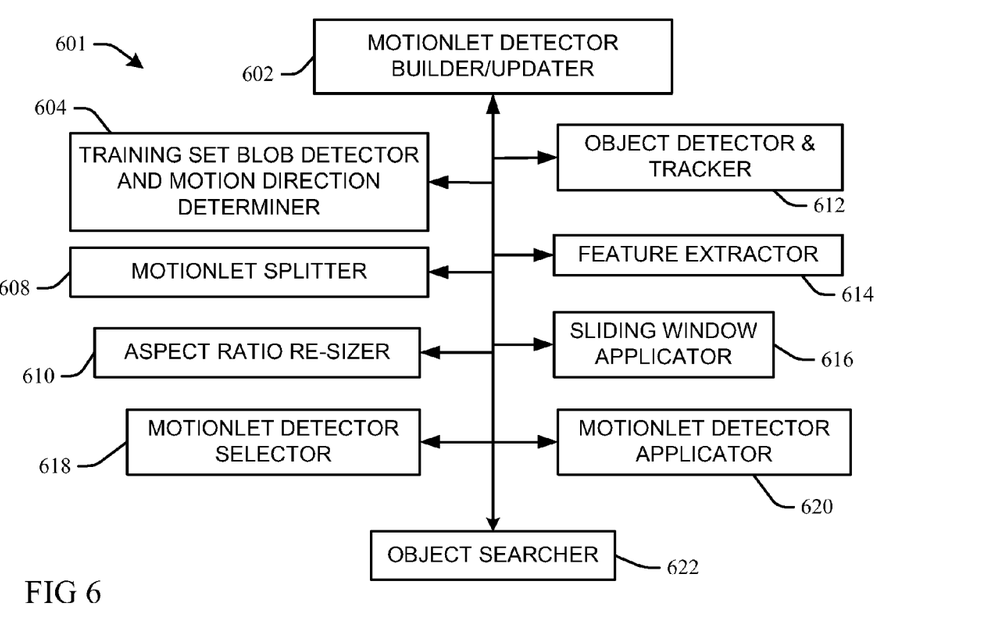
FIG. 6 is a block diagram illustration of an article according to the present invention that detects objects in video and searches data generated from the detection for vehicles as a function of their semantic attributes.

FIG. 6 illustrates an article 601 (for example, a programmable device, system, etc.) according to the present invention that learns detectors and finds detected objects in video data as a function of semantic attributes. One or more of the components of the article 601 are tangible devices that perform specific functions, for example comprising the processing unit 538, the computer readable memory 516 and the computer readable storage medium 532 described above. Thus, as understood by reference to FIGS. 1-5 and the associated description material above, a training set blob detector 604 determines a motion direction of each detected object blob (for example, through an optical flow process). A motionlet splitter 608 clusters the training set blobs by their motion directions, and an aspect ratio re-sizer 610 resizes all of the training images in each cluster into the same aspect ratio. A motionlet detector builder/updater 602 builds motionlet detectors/classifiers from the clustered motionlets, and may also update the built-learned motionlet detectors in response to performance feedback.

A sliding window applicator 616 finds an image blob in an input video and deforms a sliding window to frame about the blob in response to a shape of the blob. A motionlet detector selector 618 selects one or more motionlet detectors for application as a function of the motion direction determined for the image blob from the sliding window. A motionlet detector applicator 620 applies the selected one or more motionlet detectors to the image blob, which may include deforming a motionlet detector to conform the image blob in the sliding window. An object detector and tracker 612 detects an object in the image blob in response to firings of the one or more of the selected motionlet detectors and tracks movement of said detected object through video frames of the video data. A feature extractor 614 extracts semantic attributes of the detected object through use of the sliding window (and optionally estimates data, including world coordinates) and saves the extracted and/or estimated data to a database or otherwise provides the data to an object searcher 622 for searching the data for a detected object as a function of its semantic attributes.

Embodiments of the present invention may also perform process steps of the invention on a subscription, advertising, and/or fee basis. That is, a service provider could offer to learn detectors and/or find detected objects in video data as a function of semantic attributes including motion direction as described above with respect to FIGS. 1-6. Thus, the service provider can create, maintain, and support, etc., a computer infrastructure, such as the network computer system 522, network environment 526, and/or the article 601 (or parts thereof) that perform the process steps of the invention for one or more customers. In return, the service provider can receive payment from the customer(s) under a subscription and/or fee agreement and/or the service provider can receive payment from the sale of advertising content to one or more third parties. Services may comprise one or more of: (1) installing program code on a computing device, such as the computers/ devices 522, from a computer-readable medium device 516, 520 or 506; (2) adding one or more computing devices to a computer infrastructure; and (3) incorporating and/or modifying one or more existing systems of the computer infrastructure to enable the computer infrastructure to perform the process steps of the invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Certain examples and elements described in the present specification, including in the claims and as illustrated in the Figures, may be distinguished or otherwise identified from others by unique adjectives (e.g. a "first" element distinguished from another "second" or "third" of a plurality of elements, a "primary" distinguished from a "secondary" one or "another" item, etc.) Such identifying adjectives are generally used to reduce confusion or uncertainty, and are not to be construed to limit the claims to any specific illustrated element or embodiment, or to imply any precedence, ordering or ranking of any claim elements, limitations or process steps.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for object detection as a function of a motion direction attribute, the method comprising:

clustering training data set object images corresponding to object motion blobs into each of a plurality of motionlet sets as a function of similarity of their associated motion direction attributes, each of the motionlet sets comprising object image associated with similar motion direction attributes that are distinguished from the motion direction attributes of the object image blobs in others of the motionlet sets;

resizing the clustered motionlet pluralities of object images from their respective original aspect ratios into a same aspect ratio, wherein the motionlet object images may have different original respective aspect ratios;

learning motionlet detectors for each of the motionlet sets from features extracted from the resized training blobs and from sets of negative images of non-object image patches of the same aspect ratio obtained from background images;

applying a deformable sliding window to detect an object blob in an input video obtained by background modeling by varying at least one of a size, a shape and an aspect ratio of the sliding window to conform to a shape of the detected input video object blob;

extracting a motion direction of an underlying image patch of the detected input video object blob;

selecting at least one of the motionlet detectors that has a motion direction similar to the motion direction extracted from an underlying image patch of the input video object blob;

applying the selected at least one motionlet detector to the detected input video object blob;

determining that an object has been detected within the detected input video object blob and extracting semantic attributes of the underlying image patch of the input video object blob if a one of the selected and applied at least one motionlet detectors fires; and storing the extracted semantic attributes of the underlying image patch of the input video object blob in a database for searching for the detected object as a function of its extracted semantic attributes.

2. The method of claim 1, wherein the applying the deformable sliding window to detect the object blob in the input video obtained by background modeling comprises:

varying the shape of the deformable sliding window to a first non-rectangular curved shape to conform to a first curved shape of the detected input video object blob; and varying the shape of the deformable sliding window to a second curved shape to conform to another curved shape of another detected input video object blob that is different from the first non-rectangular curved shape of the detected input video object blob.

3. The method of claim 1, wherein the applying the deformable sliding window to detect the object blob in the input video obtained by background modeling comprises:

varying the aspect ratio of the deformable sliding window to a first aspect ratio to conform to a shape of the detected input video object blob; and varying the aspect ratio of the deformable sliding window to a second aspect ratio to conform to another shape of another detected input video object blob that is different from the shape of the detected input video object blob, the second aspect ratio different from the first aspect ratio.

4. The method of claim 3, wherein the resizing the motionlet object images from their respective original aspect ratios into the same aspect ratio comprises resizing a first plurality of motionlet object images of different object types, each of the different object type images having different original respective aspect ratios;

wherein the learning the motionlet detectors for each of the motionlet sets comprises learning a first single motionlet detector for the first plurality of motionlet object images of different object types; and wherein the applying the selected at least one motionlet detector to the detected input video object blob comprises applying the first single motionlet detector to detected input video object blobs of each of the different object types to determine that any of the different object types has been detected within the detected input video object blob and extracting semantic attributes of the underlying image patch of the input video object blob if the first motionlet detector fires.

5. The method of claim 4, wherein the extracted semantic attributes of the detected input video object blob further comprise a width and a height dimension in pixels for the underlying image patch of the detected input video object blob; and wherein the method further comprises:
calibrating a scene in an image field of view of the detected input video object blob; and
estimating a width, height, and length of the detected object vehicles in world coordinates as a function of the extracted width and height dimensions in pixels and of the scene calibrating.

6. The method of claim 4, wherein the extracting the motion direction of the underlying image patch of the detected input video object blob is an optical flow process.

7. The method of claim 4, further comprising:
selecting the sets of negative images for learning the motionlet detectors from patches for which a current motionlet detector fails.

8. A system, comprising:
a processing unit, computer readable memory and a computer readable storage medium;
first program instructions to cluster training data set object images corresponding to object motion blobs into each of a plurality of motionlet sets as a function of similarity of their associated motion direction attributes, each of the motionlet sets comprising object image associated with similar motion direction attributes that are distinguished from the motion direction attributes of the object image blobs in others of the motionlet sets, the pluralities of the motionlet object images resized from their respective original aspect ratios into a same aspect ratio, wherein the motionlet object images may have different original respective aspect ratios;
second program instructions to learn motionlet detectors for each of the motionlet sets from features extracted from the resized training blobs and from sets of negative images of non-object image patches of the same aspect ratio obtained from background images;
third program instructions to apply a deformable sliding window to detect an object blob in an input video obtained by background modeling by varying at least one of a size, a shape and an aspect ratio of the sliding window to conform to a shape of the detected input video object blob, and to extract a motion direction of an underlying image patch of the detected input video object blob; and
fourth program instructions to select at least one of the motionlet detectors that has a motion direction similar to the motion direction extracted from an underlying image patch of the input video object blob, apply the selected at least one motionlet detector to the detected input video object blob and determine that an object has been detected within the detected input video object blob and extract semantic attributes of the underlying image patch of the input video object blob if a one of the selected and applied at least one motionlet detectors fires, and to store the extracted semantic attributes of the underlying image patch of the input video object blob in a database for searching for the detected object as a function of its extracted semantic attributes;
wherein the first, second, third and fourth program instructions are stored on the computer readable storage medium for execution by the processing unit via the computer readable memory.

9. The system of claim 8, wherein the third program instructions are further to apply the deformable sliding window to detect the object blob in the input video obtained by background modeling by:
varying the shape of the deformable sliding window to a first non-rectangular curved shape to conform to a first curved shape of the detected input video object blob; and
varying the shape of the deformable sliding window to a second curved shape to conform to another curved shape of another detected input video object blob that is different from the first non-rectangular curved shape of the detected input video object blob.

10. The system of claim 8, wherein the third program instructions are further to apply the deformable sliding window to detect the object blob in the input video obtained by background modeling by:
varying the aspect ratio of the deformable sliding window to a first aspect ratio to conform to a shape of the detected input video object blob; and
varying the aspect ratio of the deformable sliding window to a second aspect ratio to conform to another shape of another detected input video object blob that is different from the shape of the detected input video object blob, the second aspect ratio different from the first aspect ratio.

11. The system of claim 10, wherein the first program instructions are further to resize the plurality of the motionlet object images from their respective original aspect ratios into the same aspect ratio by resizing a first plurality of motionlet object images of different object types, each of the different object type images having different original respective aspect ratios;
wherein the second program instructions are further to the learn the motionlet detectors for each of the motionlet sets by learning a first single motionlet detector for the first plurality of motionlet object images of different object types; and
wherein the third program instructions are further to the apply the selected at least one motionlet detector to the detected input video object blob by applying the first single motionlet detector to detected input video object blobs of each of the different object types to determine that any of the different object types has been detected within the detected input video object blob and extracting semantic attributes of the underlying image patch of the input video object blob if the first motionlet detector fires.

12. The system of claim 10, wherein the second program instructions are further to select the sets of negative images for learning the motionlet detectors from patches for which a current motionlet detector fails.

13. An article of manufacture, comprising:
a computer readable storage hardware device having computer readable program code embodied therewith, the computer readable program code comprising instructions that, when executed by a computer processor, cause the computer processor to:
cluster training data set object images corresponding to object motion blobs into each of a plurality of motionlet sets as a function of similarity of their associated motion direction attributes, each of the motionlet sets comprising object image associated with similar motion direction attributes that are distinguished from the motion direction attributes of the object image blobs in others of the motionlet sets, the pluralities of the motionlet object images resized from their respective original aspect ratios into a same aspect ratio, wherein the motionlet object images may have different original respective aspect ratios;
learn motionlet detectors for each of the motionlet sets from features extracted from the resized training blobs and from sets of negative images of non-object image patches of the same aspect ratio obtained from background images;

apply a deformable sliding window to detect an object blob in an input video obtained by background modeling by varying at least one of a size, a shape and an aspect ratio of the sliding window to conform to a shape of the detected input video object blob, and to extract a motion direction of an underlying image patch of the detected input video object blob; and select at least one of the motionlet detectors that has a motion direction similar to the motion direction extracted from an underlying image patch of the input video object blob, apply the selected at least one motionlet detector to the detected input video object blob;

determine that an object has been detected within the detected input video object blob and extract semantic attributes of the underlying image patch of the input video object blob if a one of the selected and applied at least one motionlet detectors fires; and store the extracted semantic attributes of the underlying image patch of the input video object blob in a database for searching for the detected object as a function of its extracted semantic attributes.

14. The article of manufacture of claim 13, wherein the computer readable program code instructions, when executed by the computer processor, further cause the computer processor to apply the deformable sliding window to detect the object blob in the input video obtained by background modeling by:

varying the shape of the deformable sliding window to a first non-rectangular curved shape to conform to a first curved shape of the detected input video object blob; and varying the shape of the deformable sliding window to a second curved shape to conform to another curved shape of another detected input video object blob that is different from the first non-rectangular curved shape of the detected input video object blob.

15. The article of manufacture of claim 13, wherein the computer readable program code instructions, when executed by the computer processor, further cause the computer processor to apply the deformable sliding window to detect the object blob in the input video obtained by background modeling by:

varying the aspect ratio of the deformable sliding window to a first aspect ratio to conform to a shape of the detected input video object blob; and varying the aspect ratio of the deformable sliding window to a second aspect ratio to conform to another shape of another detected input video object blob that is different from the shape of the detected input video object blob, the second aspect ratio different from the first aspect ratio.

16. The article of manufacture of claim 15, wherein the computer readable program code instructions, when executed by the computer processor, further cause the computer processor to select the sets of negative images for learning the motionlet detectors from patches for which a current motionlet detector fails.

17. A method of providing a service for object detection as a function of a motion direction attribute, the method comprising providing:

a motionlet splitter that clusters training data set object images corresponding to object motion blobs into each of a plurality of motionlet sets as a function of similarity of their associated motion direction attributes, each of the motionlet sets comprising object image associated with similar motion direction attributes that are distinguished from the motion direction attributes of the object image blobs in others of the motionlet sets;

an aspect ratio resizer that resizes the clustered motionlet pluralities of object images from their respective original aspect ratios into a same aspect ratio, wherein the motionlet object images may have different original respective aspect ratios;

a motionlet detector builder that builds motionlet detectors for each of the motionlet sets from features extracted from the resized training blobs and from sets of negative images of non-object image patches of the same aspect ratio obtained from background images;

a sliding window applicator that detects an image blob in an input video and deforms a sliding window to frame about the detected blob in response to a shape of the detected blob by varying at least one of a size, a shape and an aspect ratio of the sliding window to conform to the shape of the detected blob; and a feature extractor that extracts a motion direction of an underlying image patch of the detected input video object blob, selects at least one of the motionlet detectors that has a motion direction similar to the motion direction extracted from an underlying image patch of the input video object blob, applies the selected at least one motionlet detector to the detected input video object blob, determines that an object has been detected within the detected input video object blob and extracts semantic attributes of the underlying image patch of the input video object blob if a one of the selected and applied at least one motionlet detectors fires, and stores the extracted semantic attributes of the underlying image patch of the input video object blob in a database for searching for the detected object as a function of its extracted semantic attributes.

18. The method of claim 17, wherein the sliding window applicator:

varies the shape of the deformable sliding window to a first non-rectangular curved shape to conform to a first curved shape of the detected input video object blob; and varies the shape of the deformable sliding window to a second curved shape to conform to another curved shape of another detected input video object blob that is different from the first non-rectangular curved shape of the detected input video object blob.

19. The method of claim 17, wherein the sliding window applicator:

varies the aspect ratio of the deformable sliding window to a first aspect ratio to conform to a shape of the detected input video object blob; and varies the aspect ratio of the deformable sliding window to a second aspect ratio to conform to another shape of another detected input video object blob that is different from the shape of the detected input video object blob, the second aspect ratio different from the first aspect ratio.

20. The method of claim 19, wherein the motionlet detector builder selects the sets of negative images for learning the motionlet detectors from patches for which a current motionlet detector fails.

* * * * *